United States Patent [19]

Peterson et al.

[11] 3,795,147
[45] Mar. 5, 1974

[54] ATMOSPHERE DETECTOR FOR HELICOPTER BLADES

[75] Inventors: Carl L. Peterson, Gloucester; James D. Korumpas, Salem, both of Mass.

[73] Assignee: GTE Sylvania Incorporated, Danvers, Mass.

[22] Filed: Feb. 2, 1972

[21] Appl. No.: 222,793

[52] U.S. Cl............................ 73/49.3, 73/52, 416/61
[51] Int. Cl. ............................................. G01m 3/14
[58] Field of Search ........... 73/40 R, 52; 116/114 P; 416/61; 23/233 R, 254 R, 230 L, 253 TP; 99/192 TI; 252/408

[56] References Cited
UNITED STATES PATENTS

| | | |
|---|---|---|
| 3,555,884 | 1/1971 | Yamamoto et al. .............. 73/49.3 X |
| 3,684,737 | 8/1972 | Emigh .......................... 23/253 TP X |
| 3,585,963 | 6/1971 | Hiszpansk ................ 116/114 AM X |
| 3,134,445 | 5/1962 | Hotchkiss .............................. 416/61 |

Primary Examiner—Jerry W. Myracle
Assistant Examiner—Daniel M. Yasich
Attorney, Agent, or Firm—Edward J. Coleman

[57] ABSTRACT

An atmosphere detector for providing a visual indication of the presence or absence of a crack in a helicopter blade. The detector comprises a glass bulb having an internal coating of barium and mounted in sealed communication with the interior of the hollow blade, which is filled with nitrogen at a pressure different from atmospheric. The barium coating changes color in the presence of a sufficient amount of oxygen, thereby indicating an air leak.

7 Claims, 4 Drawing Figures

PATENTED MAR 5 1974          3,795,147

ATMOSPHERE DETECTOR FOR HELICOPTER BLADES

BACKGROUND OF THE INVENTION

This invention relates to leak detectors and, more particularly, to an improved detection means for providing a visual indication of the presence or absence of a crack in a helicopter blade.

A major problem encountered in the operation of helicopters is the fatiguing of the helicopter blades. This results in the developing of cracks which during the course of operation become larger and multiply and can cause a sudden and violent failure of the member. As it is expensive and somewhat difficult to periodically remove blades and check for cracks, it would be very desirable to have a means of visually detecting whether or not a blade has developed cracks during its life without having to remove the blade from the craft.

The normal procedure for checking helicopter blades prior to installation on the aircraft is to insure that each hollow member is vacuum tight and then to fill the member with nitrogen and seal it off from the atmosphere. A known method of detecting cracks depends on a change of pressure within the hollow helicopter blade as the cracks develop. As the blade may be filled to a pressure on the order of 2 psi above or below atmospheric pressure, upon development of a crack, the pressure in the blade will increase if filled to below atmospheric and decrease if filled to above atmospheric when the outside air leaks in or nitrogen leaks out to balance atmospheric pressure.

FIG. 1 illustrates a typical prior art device for detecting this change in pressure due to a crack in the blade. A transparent plastic housing 10 of generally tubular shape is mounted on the inboard side of the blade 12 on the trailing edge. The general location of the detector housing 10 is illustrated in the sketch of a helicopter 14 shown in FIG. 2. The operating members of the detector comprise a bellows 16 to which is attached a shaft 18 which is supported coaxially within the plastic housing 10 by a number of disc-shaped colored indicators 20. If the pressure within the blade changes, the shaft 18 with the indicators 20 moves linearly. The outer surface of the transparent housing 10 is painted with a pattern or contrasting color to the indicators so that a change in pressure results in a change in pattern, thereby providing a visual indication.

As the filling pressure of the blade is limited, however, the bellows 16 has to be sensitive, and as a result, friction forces become significant. In actual practice, therefore, the above described pressure change detector has proven to be somewhat unreliable and otherwise disadvantageous. The visual indication has not been clear enough, and it has been found difficult to positively state that cracks exist when inspecting the detector housing 10 from the ground when the helicopter is at rest.

SUMMARY OF THE INVENTION

Accordingly, it is an object of the present invention to provide an improved means for detecting an air leak in a sealed container.

A principal object of the invention is to provide an improved detection means for providing a clear and reliable visual indication of the presence or absence of a crack in a helicopter blade.

Briefly, these objects are attained by mounting on the helicopter blade, in sealed communication with its interior, a transparent envelope, such as a glass bulb, which has a quantity of barium coated on its inside surface. When exposed to oxygen, the barium coating provides a rapid and marked change in color from a black to a white or light translucent appearance. The bulb projects from the blade so that the color of the barium coating is readily visible upon inspection from the ground.

BRIEF DESCRIPTION OF THE DRAWINGS

This invention will be more fully described hereinafter in conjunction with the accompanying drawings, in which.

DESCRIPTION OF PREFERRED EMBODIMENT

Figure 3:
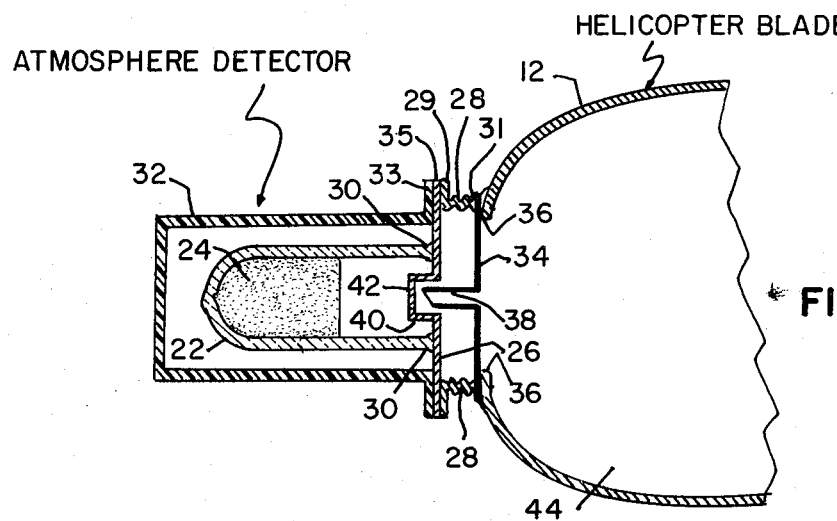
FIG. 3 is a cross-sectional view of an atmosphere detector mounted on a helicopter blade according to the invention, the detector being shown as it would appear prior to being rendered operational.

Referring to FIG. 3, an atmosphere detector according to the present invention is shown as comprising a transparent glass bulb 22 having a quantity of barium 24 coated on its interior surface, for example, by flashing and vacuum deposition. About 4 milligrams of barium has been found to be sufficient. Preferably, the barium coating 24 should appear black in the absence of oxygen. Deposition of an excessively thick coating or the introduction of metallic impurities may result in an undesirable metallic or silvery appearance.

Figure 1:
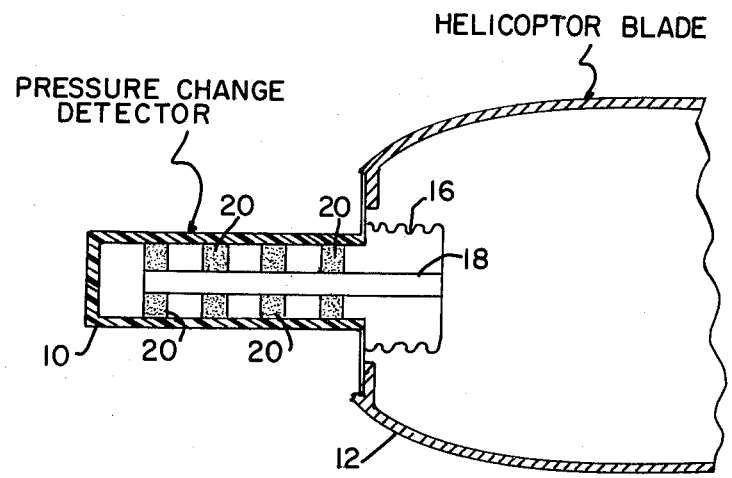
FIG. 1 is a cross-sectional view of a prior art pressure change detector mounted on a helicopter blade, to which reference has previously been made.
Figure 2:
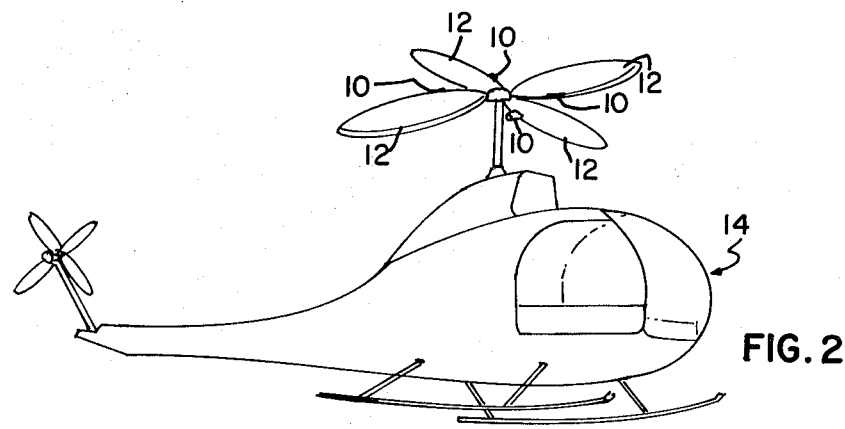
FIG. 2 is a simplified perspective view of a helicopter showing the locations of the detector of FIG. 1, to which reference has previously been made.

The bulb 22 is mounted on the helicopter blade 12 by means including a metal diaphragm 26 and a bellows 28 so that the bulb projects outwardly from the blade 12 whereby any change in the color of the barium coating is plainly visible. The bulb is initially evacuated, and diaphragm 26 is secured across the otherwise open end of the bulb facing the blade by means of a glass-to-metal seal 30. Also attached to the diaphragm 26 is a tubular, translucent plastic housing 32 for providing a protective enclosure for the bulb. This assembly is facilitated by a flange 33 on plastic housing 32 which may be peripherally secured to the diaphragm by an epoxy adhesive 35 or by the use of bolts in combination with a sealing gasket. The housing 32 and barium coated bulb 22 have generally the same location on blade 12 as the old pressure detector housing 10, illustrated in FIGS. 1 and 2, namely, on the inboard trailing edge of blade 12.

The detector mounting structure further includes a disc-shaped mounting plate 34 which is peripherally sealed, such as by welding, over an opening 36 in the blade 12. The bellows 28 is attached between the diaphragm 26 and mounting plate 34 and functions to support the diaphragm away from the mounting plate. This assembly is facilitated by the flanges 29 and 31 which may be welded to diaphragm 26 and plate 34, respectively. A tubular member 38 projects from mounting plate 34 toward the diaphragm 26, and the disc-shaped metal diaphragm has a tubular member 40 projecting toward the interior of bulb 22 which is adapted to receive the tubular member 38. The end of member 40 within the bulb is closed by a thin metal wall 42 in the view shown in FIG. 3. This represents the appearance of the atmosphere detector before being rendered operational.

As before, the blade 12 is leak checked to insure that the hollow member is vacuum tight, and then the interior 44 of the blade is filled with nitrogen and sealed off from the atmosphere. Typically, the fill pressure is in the order of 2 psi above or below atmospheric pressure.

Figure 4:
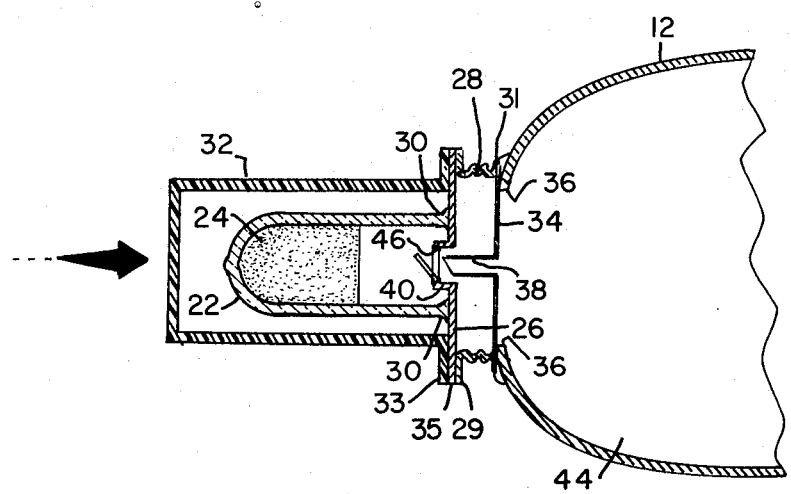
FIG. 4 is the same view of FIG. 3 except the detector is shown as it would appear after being made operational.

Once the nitrogen fill and sealing operations are completed, the detector is rendered operational by momentarily pushing in on the detector housing 32, as shown by the arrow (FIG.4), so that the bellows are compressed and the pointed end of tubular member 38 pierces the thin diaphragm wall 42 to provide a hole 46. As illustrated in FIG. 4, this places bulb 22 in sealed communication with the interior 44 of the blade, whereby the nitrogen gas within the blade may flow into the bulb 22 via tubular member 38 and the pierced hole 46 in the diaphragm.

As nitrogen is inert with respect to barium, the coating 24 is black in appearance at the outset. When a crack develops and oxygen enters the blade through diffusion and due to the pressure differential between the nitrogen fill and the atmosphere, the barium immediately combines with the oxygen on contact to form barium oxide. In addition, as the barium combines with the oxygen, the pressure in the blade is reduced slightly and the reaction creates a very slight pumping action due to the gettering of oxygen. Accordingly, the black coating changes very rapidly to a white or very light transparent coating. By using a barium coated bulb, therefore, a rapid and marked change in appearance occurs upon exposure to oxygen, thereby providing a clearly readable indication of the structural integrity of blade at any given moment.

There are a number of materials available which change color upon exposure to the atmosphere, either by oxidation or a reaction with water vapor. However, we have found barium to be particularly advantageous in the present application due to its dramatic and rapid (less than a minute) change in color and its relative ease of handling. Barium is not overly sensitive to very small amounts of oxygen, and it is commercially prepared for relatively easy deposition by flashing to obtain a uniform coating. Further, due to the relative proportions of oxygen at various altitudes, barium provides a more reliable atmosphere detector than a purely water vapor reactive material.

Although the invention has been described with respect to a specific embodiment, it will be appreciated that modifications and changes may be made by those skilled in the art without departing from the true spirit and scope of the invention. For example, it is clear that the described device may be employed for detecting air leaks in numerous other types of sealed containers in lieu of the aforementioned helicopter blade. Also, the device is applicable to sealed containers filled with gases other than nitrogen, provided the gas is inert with respect to barium, and it may also be used to detect leaks in vacuum sealed containers. Although a pressure differential is preferred, the gas fill may be at a pressure equal to atmospheric. Further, the mounting structure may take a variety of configurations, and in lieu of a glass bulb, the barium coating may be supported by any type of transparent envelope which is mounted on the container in sealed communication with its interior; e.g. the "envelope" may comprise a window on the container, the barium being coated on the inside surface of the window.

What we claim is:

1. Means for detecting an air leak in a sealed container the interior of which is substantially free of oxygen and has a gas fill at a pressure different from atmospheric, said detecting means comprising, in combination, a transparent envelope or bulb means mounted on said container to be clearly visible from the exterior thereof and in sealed communication with respect to the interior thereof, a quantity of barium coated on the interior surface of said envelope whereby any change in color of said barium coating is visible from outside of said envelope and container, said barium coating having been applied so as to have a substantially black appearance in the absence of oxygen, said fill gas being inert with respect to said barium coating, said bulb being mounted and sealed on said container by means including a diaphragm across the otherwise open end of said bulb facing said container, and means for piercing a hole in said diaphragm to provide said communication between the barium coated bulb and the interior of said container whereby said inert gas also fills said bulb to render said detecting means operational.

2. Detecting means according to claim 1 wherein said container is filled with nitrogen at a pressure different from atmospheric.

3. In combination with a hollow helicopter blade the interior of which is sealed off from the atmosphere and contains a substantially oxygen-free gas, an atmosphere detector for providing a visual indication of the presence or absence of a crack in said blade, said detector comprising, a transparent bulb mounted on said blade to be clearly visible from the exterior thereof in sealed communication with respect to the interior thereof, and a quantity of barium coated on the interior surface of said bulb whereby any change in color of said barium coating is visible from outside of said bulb and blade, the gas in said blade being inert with respect to said barium coating, and said barium coating having been applied so as to have a substantially black appearance in the absence of oxygen, said bulb being mounted to said blade and sealed by means including a diaphragm across the otherwise open end of said bulb facing said blade, and means for piercing said hole in said diaphragm to provide said communication between the barium coated bulb and the interior of said blade whereby said oxygen-free gas also fills said bulb to render said detector operational.

4. The combination of claim 3 wherein said piercing means is disposed over an opening in said blade and projects toward said diaphragm, and wherein said means for mounting the bulb to said blade further includes a bellows supporting said diaphragm away from said piercing means.

5. The combination of claim 4 wherein said bulb is glass, and said detector further includes a transparent plastic housing enclosing said glass bulb.

6. The combination of claim 4 wherein the fill gas in said blade is nitrogen at a pressure different from atmospheric.

7. The combination of claim 4 wherein said diaphragm comprises a metal plate having a tubular member projecting toward the interior of said bulb and adapted to receive said piercing means, the end of the tubular member of said diaphragm within said bulb being closed by a thin metal wall prior to the piercing of said diaphragm, said thin metal wall being the portion of said diaphragm which is pierced.

* * * * *